(12) United States Patent
Betsche et al.

(10) Patent No.: US 12,055,384 B2
(45) Date of Patent: Aug. 6, 2024

(54) APPARATUS AND METHOD FOR CAPTURING AN OBJECT SURFACE BY ELECTROMAGNETIC RADIATION

(71) Applicant: Carl Zeiss Industrielle Messtechnik GmbH, Oberkochen (DE)

(72) Inventors: Andreas Betsche, Stephanskirchen (DE); Dirk Beckmann, Rosenheim (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 916 days.

(21) Appl. No.: 16/514,956

(22) Filed: Jul. 17, 2019

(65) Prior Publication Data

US 2020/0025559 A1   Jan. 23, 2020

(30) Foreign Application Priority Data

Jul. 17, 2018   (DE) .................. 10 2018 211 913.9

(51) Int. Cl.
*G01B 11/25*   (2006.01)
*G01B 11/14*   (2006.01)
(Continued)

(52) U.S. Cl.
CPC .......... *G01B 11/2518* (2013.01); *G01B 11/14* (2013.01); *G01B 11/22* (2013.01); *G01S 7/4817* (2013.01); *G01S 17/89* (2013.01)

(58) Field of Classification Search
CPC ...... G01B 11/14; G01B 11/24; G01B 11/2518
See application file for complete search history.

(56) References Cited

U.S. PATENT DOCUMENTS 4,848,908 A * 7/1989 Huang ................. G01B 11/303
356/489
5,349,440 A * 9/1994 DeGroot ............ G01B 9/02027
356/489
(Continued)

FOREIGN PATENT DOCUMENTS

CN   1677053 A   10/2005
CN   201748918 U   2/2011
(Continued)

OTHER PUBLICATIONS

Office Action issued in Chinese Counterpart Patent Application No. 201910643145.6 dated Nov. 18, 2020 and English language translation thereof.
(Continued)

*Primary Examiner* — Jeremiah C Hallenbeck-Huber
(74) *Attorney, Agent, or Firm* — Ewers IP Law PLLC; Falk Ewers

(57) ABSTRACT

An apparatus and method for capturing an object surface by electromagnetic radiation are provided. The apparatus includes a radiation generation device having a beam source and being configured to radiate a first and a second electromagnetic radiation having a first and second wavelength, respectively, onto a measurement point or a region of the object surface without emitting radiation onto the measurement point or onto the region, or without emitting radiation utilized for surface capturing, in a wavelength range between the first and the second wavelengths, a capturing device to capture for the measurement point a first and a second measurement value, the first measurement value being based on reflected radiation having the first wavelength and the second measurement value being based on reflected radiation having the second wavelength, and each of the first and second measurement values representing a (Continued)

distance between the capturing device and the object surface.

18 Claims, 6 Drawing Sheets

(51) Int. Cl.
*G01B 11/22* (2006.01)
*G01S 7/481* (2006.01)
*G01S 17/89* (2020.01)

(56) References Cited

U.S. PATENT DOCUMENTS

| | | | | |
|---|---|---|---|---|
| 6,038,028 | A * | 3/2000 | Grann | G01B 11/0691 |
| | | | | 356/630 |
| 6,094,270 | A | 7/2000 | Uomori et al. | |
| 6,268,918 | B1 | 7/2001 | Tanabe et al. | |
| 6,781,699 | B2 * | 8/2004 | Dunn | G01B 9/02019 |
| | | | | 356/241.3 |
| 7,417,716 | B2 | 8/2008 | Nagasaka et al. | |
| 7,429,999 | B2 * | 9/2008 | Poulin | G06T 7/521 |
| | | | | 348/187 |
| 8,179,534 | B2 * | 5/2012 | Sesko | G01B 9/02067 |
| | | | | 356/486 |
| 8,353,059 | B2 | 1/2013 | Crampton et al. | |
| 2003/0071194 | A1 | 4/2003 | Mueller et al. | |
| 2005/0088529 | A1 | 4/2005 | Geng | |
| 2007/0097381 | A1 | 5/2007 | Tobiason et al. | |
| 2009/0128807 | A1 * | 5/2009 | Sonehara | G01N 21/648 |
| | | | | 356/318 |
| 2012/0229606 | A1 | 9/2012 | Rodrigue et al. | |
| 2012/0307260 | A1 * | 12/2012 | Keshavmurthy | G01B 11/2513 |
| | | | | 356/601 |
| 2014/0049779 | A1 * | 2/2014 | Tin | G01N 21/474 |
| | | | | 356/456 |
| 2014/0218504 | A1 * | 8/2014 | Couturier | G01B 11/24 |
| | | | | 348/93 |
| 2015/0015898 | A1 | 1/2015 | Atwell et al. | |
| 2015/0103358 | A1 | 4/2015 | Flascher | |
| 2015/0185000 | A1 | 7/2015 | Wilson et al. | |
| 2017/0224272 | A1 * | 8/2017 | Liu | A61B 5/1077 |
| 2017/0276476 | A1 * | 9/2017 | Konno | G01C 9/02 |
| 2018/0143415 | A1 * | 5/2018 | Hollricher | G01B 9/04 |
| 2018/0348537 | A1 * | 12/2018 | Naftali | G02B 27/48 |
| 2019/0331757 | A1 * | 10/2019 | Motzer | G01N 29/2418 |
| 2020/0138553 | A1 * | 5/2020 | Fan | A61C 7/08 |

FOREIGN PATENT DOCUMENTS

| | | |
|---|---|---|
| DE | 102005014525 A1 | 10/2006 |
| DE | 102010032407 B3 | 12/2011 |
| DE | 102015111905 A1 | 1/2017 |
| DE | 102015214857 A1 | 2/2017 |
| EP | 0076866 B1 | 5/1985 |
| EP | 1126412 A2 | 8/2001 |
| EP | 2149779 B1 | 6/2013 |
| EP | 2515071 B1 | 9/2014 |
| JP | 07248211 A | 9/1995 |
| JP | 09297014 A | 11/1997 |
| JP | 2009554969 A | 9/2009 |
| WO | 2004032126 A1 | 4/2004 |
| WO | 2017186851 A1 | 11/2017 |

OTHER PUBLICATIONS

Notice of Opposition issued in German Patent Application No. DE 10 2018 211 913.9, dated Jul. 13, 2023 (from which this application claims priority) and English language translation thereof.

* cited by examiner

APPARATUS AND METHOD FOR CAPTURING AN OBJECT SURFACE BY ELECTROMAGNETIC RADIATION

CROSS REFERENCE TO RELATED APPLICATIONS

This application claims priority to German patent application DE 10 2018 211 913.9, filed Jul. 17, 2018, the entire content of which is incorporated herein by reference.

TECHNICAL FIELD

The disclosure relates to an apparatus and to a method for capturing an object surface by electromagnetic radiation. In particular, the disclosure relates to capturing an object surface to determine distance information, for example by at least one laser scanner, typically a laser line scanner, emitting electromagnetic radiation having different wavelengths.

BACKGROUND

It is known to capture object surfaces for example of industrially produced workpieces by optical sensors (in a contactless manner). In this way, data can be acquired for measuring and/or imaging the object surface. Measuring typically includes measuring the object surface in the depth dimension thereof (for example what is known as a Z-dimension) and/or generally determining three-dimensional properties of the object surface. In particular, information relating to a distance between the object and the optical sensor can be determined owing to the measuring, and the measurement values obtained can be combined in the form of what are known as 3D point clouds. As a result, the three-dimensional properties of an object surface can thus be determined, such as the shape thereof. In particular, the measurement values can be used to determine the dimensions and geometric sizes (such as diameter or width), to compare the results with specifications and to assess them, to calculate properties of the object (for example quality parameters), and/or to generate a three-dimensional graphic representation of the object.

Optical sensors are used to measure the object surface. One type of optical sensors are laser sensors that emit laser radiation and direct it onto the object surface and also capture a radiation component that was reflected by the object surface. The emitted radiation is here typically moved in relation to and along the object surface so as to scan the object surface in a contactless manner. Apparatuses having such a laser sensor are also referred to as laser scanners. The relative movement between the radiation and the object can be accomplished by moving the laser sensor, which can be operated automatically, supported by machinery, and/or with manual movement of a handheld laser sensor. Movable optical units that guide the radiation along the object surface, for example by movable mirrors, can be provided additionally or as an alternative.

Laser sensors, or laser scanners, emit electromagnetic radiation in the form of laser radiation have typically merely one defined wavelength or one defined wavelength range. The incident radiation forms a measurement region on the object surface, which may be point-shaped or line-shaped, for example. The measurement region generally includes a plurality of measurement points that are located on the object surface and for which a measurement value is to be determined in each case. The incident laser radiation is reflected by the object surface (or by the measurement points) and captured by a suitable capturing device of the sensor (for example including a camera).

Next, a distance (or Z-value) between the capturing device and the object surface can be determined as distance information in a manner which is known per se. This can be accomplished using triangulation principles. If, for example, a position of the laser scanner, a current setting of a movable optical unit thereof that may be present, and/or a position of a measurement point that has currently been measured on the object surface (for example in the horizontal or XY spatial plane) is/are known, it is furthermore possible for the complete 3D coordinates of the measured point on the object surface to be determined. The information that has been determined overall in this way for an object surface can be combined into a 3D data set or a 3D point cloud, which has already been mentioned. It is also possible to determine, more particularly, for example based on the distance information, depth information of the object surface, for example in an object coordinate system. The term depth information can in particular apply when the object surface extends as usual transversely to the propagation direction of the radiation that is incident on the object surface and is reflected by the object surface.

An example of establishing a three-dimensional model of an environment by way of laser scanning can be found in DE 10 2015 214 857 A1. In this case, too, a discrete quantity of measurement values for scanning points (or measurement points), which is referred to as a point cloud, is generated. The coordinates of the measured points are determined from the angles and the distance in relation to an origin, wherein the location of the laser scanner can be considered to be the origin.

However, using the solutions which are currently available on the market, it is still not possible to achieve sufficient accuracy of the measurement results. The main reason for this is that the object surfaces to be measured can largely vary with respect to their measurement-relevant properties. Such properties include, for example, a reflectance for the incident radiation, in particular when the object surface includes different materials (for example a chromium decorative trim on a plastic substrate). Further relevant properties are the shape and the color of the object surface, and also the presence of varying the bright and/or dark regions. It has been shown that the possible variety of object surfaces to be measured cannot be captured with sufficient accuracy using the solutions which have been available to date.

SUMMARY

It is therefore an object of the present disclosure to improve the quality of the measurement results when performing a three-dimensional measurement of object surfaces.

This object is achieved by an apparatus and a method for capturing an object surface as described herein. It also goes without saying that, unless otherwise specified or evident, the features mentioned in the introductory description may also be provided individually or in any desired combination in the solution that is disclosed herein.

According to an aspect of the disclosure, generally, for measuring an object surface, electromagnetic radiation having at least two different wavelengths is emitted and separate measurement values are generated on the basis of the differing reflected radiations or radiation components with each of these wavelengths. Each of the reflected radiations at one of the different wavelengths contributes at least to one of the measurement values. This does not rule out that it is not only the radiation at one of the different wavelengths that contributes to at least one of the measurement values. Rather, at least one of the measurement values can correspond to the reflected radiations, captured by a capturing device, within a wavelength range. Alternatively, at least one of the measurement values may be determined merely by way of radiation of a single wavelength that is emitted by a radiation generation device and is reflected by the object surface. This is the case in particular when the radiation of this wavelength is generated by a laser. Scattered radiation and radiation from the environment can additionally influence the measurement value undesirably. Where the text below refers to electromagnetic radiation having a wavelength, this consequently includes the possibility that the electromagnetic radiation includes, in particular within the limits of the possible generation, monochromatic radiation (for example by laser diodes) of merely one wavelength or that the electromagnetic radiation has a radiation distribution within a wavelength range. In any case, at least two electromagnetic radiations are generated and radiated onto the object surface, and at least one measurement value is generated for the reflected radiation of each of the (irradiating) radiations.

The use of different wavelengths and the determination of assigned separate measurement values has the advantage that it is possible, if disturbances or inaccuracies occur in the case of the back-reflected radiation having a specific wavelength, a measurement value that was generated based on the back-reflected radiation of a different wavelength can be used additionally or alternatively.

In detail, an apparatus for capturing an object surface is provided. The apparatus includes a radiation generation device having at least one beam source, wherein the radiation generation device is configured to radiate a first electromagnetic radiation having a first wavelength and a second electromagnetic radiation having a second wavelength onto at least one (typically a plurality of) measurement point(s) of an object surface that is to be measured or a region of an object surface that is to be measured and has at least one measurement point that is to be measured, wherein the radiation generation device is configured to generate no radiation, or no radiation that is used for surface capturing, in a wavelength range between the first and second wavelengths; and a capturing device that is configured to capture at least one first measurement value and at least one second measurement value for the measurement point or each of the measurement points (that is to say a plurality of first and/or second measurement values is also capturable), wherein the first measurement value is based on radiation having the first wavelength that is reflected by the object surface, and the second measurement value is based on radiation having the second wavelength that is reflected by the object surface.

One advantage of this solution is that at least two measurement values are available per measurement point. Out of these measurement values, one can then be selected, for example, or a total measurement value can be calculated based on all the measurement values that are available. In particular, the selected measurement value can be a measurement value of the captured measurement values that gives a more accurate or the most accurate result of all the measurement values captured for the measurement point and/or with which a lower or the lowest measurement uncertainty of all the measurement values captured for the measurement point is associated.

For example, the occurrence of radiation interference, for example in the form of speckle appearances, is dependent on the selected wavelength of the emitted radiation. In the case of speckle appearances, speckles with different radiation intensity appear in the irradiated region of the object surface. They can appear on account of the fact that interference may occur in the case of emitted radiation owing to interaction with an optical unit of the radiation generation device. For example, surfaces of optical elements can scatter the generated radiation due to a roughness that is unavoidable due to manufacturing and consequently already cause interference within the radiation generation device. The scattering can in particular be dependent on the wavelength. The intensity (or the beam flux density) of the radiation that ultimately arrives at the capturing device of the sensor can fluctuate because of this, even though originally radiation with a constant intensity was generated. In other words, radiation that was emitted with a specific intensity can already be attenuated and/or intensified within the optical unit on account of the interference mentioned, wherein this attenuation and/or intensification can vary temporally and spatially and also over the entire irradiated object region. From the point of view of the capturing device, only an unsteady signal is therefore received, despite the measurement construction remaining the same and despite a constant radiation generation, which can be manifested for example in the form of spatially and temporally varying intensity fluctuations in the captured images. Such intensity fluctuations can negatively influence the accuracy of the measurement results.

Due to the irradiation with radiation having at least two wavelengths according to an aspect of the disclosure, the likelihood that the back-reflected radiation of at least one of the wavelengths and therefore at least one of the measurement values generated therefrom is falsified due to speckle or other wavelength-dependent aberrations to a lower extent than the further measurement value is increased. According to an aspect of the disclosure, the influence of such wavelength-dependent aberration causes can be reduced by forming an average of the measurement values that have been captured for the measurement point or for each of the measurement points by the capturing device.

A further advantage of using radiation having different wavelengths arises when a reflectance of the radiation that is incident on the object surface is, as is frequently the case, wavelength-dependent. The reflected radiations captured by the capturing device can consequently have different (that is to say wavelength-specific) intensities, even if the radiation that is incident on the respective surface region has the same spectral intensity at the first and second wavelength. If one of the reflected radiation components (associated, for example, with radiation of the first wavelength) has an intensity that results in the saturation region of the sensor being reached for example at a specified exposure time (that is to say the surface has a particularly high reflectance for the wavelength of said radiation component), it is possible for example to use the measurement value that is based on radiation of a different wavelength instead.

The expression radiation component firstly means that not all the irradiating radiation is reflected toward the capturing device due to scattering effects starting from the object surface. However, the reflected radiation further contains all of the irradiating wavelengths or wavelength ranges. For this reason, typically in each case only a portion of the total reflected radiation is evaluated to determine the measurement values, wherein said portion has a specific wavelength (or a specific wavelength range).

The electromagnetic radiation can in each case be laser radiation having the corresponding first or second wavelength. The radiation generation device can include one individual beam source (for example in the form of a laser source, such as a laser diode) per emitted radiation or wavelength (that is to say a first beam source for the first radiation and a second beam source for the second radiation). Aside from the fact that, although the radiation is typically generated with a single wavelength, no exactly coherent radiation is generated, as is the case with laser diodes, and therefore a corresponding spectral line widening occurs, it is therefore possible in more general terms to refer in each case to one beam source which generates electromagnetic radiation of a single wavelength. In principle, the irradiating first and second electromagnetic radiation having the first and the second wavelength can include exclusively the corresponding wavelength. In particular, the first and second radiation can be monochromatic (that is to say it includes only the respective first or second wavelength) and/or it can be coherent at least within a measurement region of the apparatus. Generally, wavelength ranges generated by the radiation generation device in the case of monochromatic radiation can thus include merely a single wavelength. The radiation generation device can, more particularly, include (typically per emitted wavelengths) at least one beam source (for example a laser diode) and a beam-shaping optical unit. However, it is likewise possible for the radiation generation device to include only one beam source that emits a wavelength range from which a corresponding first and second radiation is then optically separated out.

A suitable beam source is in particular a laser diode (or a diode laser). The latter can be stabilized and/or include an external resonator. The coherence length of the laser diode can be a few centimeters or at least 1 meter (m).

More particularly, according to an aspect of the present disclosure, further electromagnetic radiation with individual (that is to say mutually differing) wavelengths or wavelength ranges can be emitted, for example a third and fourth electromagnetic radiation having a third and fourth wavelength, respectively. For any of the emitted wavelengths (that is to say for example for each of the first to fourth wavelengths), it is possible in the manner described below to generate one measurement value per measurement point that is individually assigned to one wavelength. In the case of a third and fourth wavelength, it is thus also possible for a third and fourth measurement value to be generated based on reflected radiation components having the respective wavelengths and to be taken into consideration for example when creating object information.

The at least first and second wavelengths of the emitted radiation differ from one another on account of a spectral distance. The emitted first and second electromagnetic radiations (and also any further optional electromagnetic radiation) can include in each case one wavelength range, including the respective first and second wavelength, wherein said wavelength ranges, however, are spectrally spaced apart from one another (that is to say they do not intersect). Generally speaking, a wavelength range exists including a defined spectral range that lies between the first and second electromagnetic radiation and in which no radiation, or no radiation that is used for surface capturing and/or is relevant or usable for and/or used for a measurement value generation (for example no radiation that is capturable or captured, convertible or generally evaluable for a measurement value generation by the capturing unit), is present or emitted. In the case of further emitted electromagnetic radiations (that is to say for example emission of a third and fourth radiation), at least one wavelength range including a defined spectral range in which no radiation, or no radiation that is used for surface capturing, is present or radiated, typically lies between all of the radiations that have been emitted overall.

For example, a corresponding wavelength range can be attained by way of at least one filter being positioned (viewed starting from the object surface and along the reflected beam path) upstream of the capturing unit and filtering out the radiation, or the wavelengths thereof, that has/have not been used for measurement value generation or surface capturing. Radiation having the corresponding wavelength(s) then no longer reaches an imaging unit of the capturing unit and is consequently no longer usable for the measurement value generation. In other words, a filter that transmits only the useful signals can be provided on the receiver side or capturing side.

It is likewise possible for a plurality of capturing units and/or imaging units to be provided, each having a dedicated filter, which means that only the correspondingly filtered radiation is used for surface capturing. The filters should here be selected to differ from one another such that reflected radiation having different wavelengths is capturable and evaluable.

According to an aspect of the disclosure, the first wavelength of the first radiation lies in the range of visible red light, and the further wavelength of the second radiation lies in the range of visible blue light, and the first and second radiations typically include in each case no other wavelengths. These radiations are accordingly spaced apart from one another by a wavelength range between red and blue light, but within which no radiation, or no radiation that is used for surface capturing and/or relevant or usable for measurement value generation, is radiated. In the case of all emitted electromagnetic radiations (or the associated wavelengths and/or wavelength ranges thereof), two radiations that are spectrally successive or successive along the wavelength spectrum (or two wavelengths and/or wavelength ranges that are adjacent along the wavelength spectrum and belong to an emitted radiation) can be spaced apart by at least 50 nanometer (nm), at least 100 nm, or at least 200 nm.

Using one of the abovementioned variants, it is possible to ensure provision of a radiation-free wavelength range and/or spectral distances between the emitted radiations. This is advantageous for example to the effect that the intensity of the individual emitted radiations can be set individually precisely, for example using beam sources that are in each case assigned to the radiations and produce them. The radiations having the individual wavelengths can be emitted by the radiation generation device in each case in the form of what is known as a fan beam, that is to say a beam that is substantially two-dimensionally expanded starting from the radiation generation device. The extent transversely to the fan beam can be negligible and/or be very small and can include, for example, a few hundred µm. If such a fan beam is incident on an object surface, it is imaged here as a line-shaped and/or elongate narrow measurement field. The fan beams can also be described as being substantially triangular, wherein the tip of the triangle is located in the region of the radiation generation device. In principle, the apparatus can thus be configured to generate an at least one-dimensional measurement field on the object surface or, in other words, project it onto the object surface, in particular in the form of a laser line. Such a measurement field can include a plurality of measurement points of the object surface that are to be measured and are arranged in a row.

The apparatus can, more particularly, be a laser scanner and in particular a laser line scanner, in which a measurement field that has been generated is line-shaped and/or one-dimensional and typically exhibits a substantially rectilinear profile (at least when a level surface is being irradiated).

In the case of a line-shaped and/or one-dimensional measurement field, the latter can be defined generally by an arrangement of individual measurement points in a row. The width of such a measurement field cannot exceed a size or a diameter of the measurement points, or can exceed it only slightly. In other words, there can only be individual measurement points along the measurement field, or, in other words, in the longitudinal direction of the measurement field, without for example a plurality of measurement points being arranged in a row transversely to the longitudinal direction of the measurement field.

Typically, measurement values are generated substantially at the same time for the measurement points on the object surface. A region of the object surface that is covered by the measurement region is then measurable substantially in a single step. However, it is likewise possible to successively project the first and second radiation and to separately determine a measurement value for the corresponding radiation or wavelength for each projection.

The measurement points can generally relate to a site within a possible line-shaped measurement field for which a measurement value is to be determined. The measurement points (also referred to as scanning points) can generally relate to the locations or sites in the measurement field and thus on the object surface at which or, in other words, for which a measurement value is to be generated. The measurement value can be, or indicate, a distance measurement value between the apparatus and the object surface (for example in the form of a Z-value). If such measurement values are arranged analogously to the measurement points in the measurement field or, in other words, are analogously arranged in a row, it is possible, based thereon, for the measured region of the object surface to be graphically imaged, for example.

The capturing device can include at least one photosensitive unit, for example a camera and/or a photosensitive sensor in the form of a CCD or CMOS sensor. The imaging unit can generally have a surface design and can be typically divided into rows and columns. The imaging unit can include a plurality of image points or pixels, for which for example individual intensity values are capturable, wherein the image points can in each case have a specific row and column position (or, in other words, defined row and column coordinates). For using triangulation principles in a known manner, the capturing device can be configured to determine a site of incidence of the reflected radiation components per measurement point on the photosensitive unit (for example computationally determining it per Gaussian fit as the site of the maximum intensity). A projected measurement field for example in the form of a line can be imaged in a column direction on the imaging unit, wherein an individual measurement point of an individual row position can be imaged along said line or, in other words, onto an individual row position. Alternatively, the line can also be imaged in the row direction, and the measurement point can have a column position.

The capturing device can include one individually assigned photosensitive unit (for example a plurality of cameras) per radiation component that is to be captured (or per wavelength). Alternatively, a single photosensitive unit (for example a single imaging or photosensitive sensor) that can capture radiation having different wavelengths can be provided, wherein the radiations are typically directed, or directable, onto different regions of the photosensitive unit. Consequently it is possible using only one photosensitive unit, which is not necessarily color-sensitive, to generate a plurality of measurement point-related measurement values on account of the different regions of incidence, because for example two measurement curves, which will be explained below, can be imaged on the same photosensitive unit. The photosensitive unit can generally be of a monochromatic design and/or capture only a limited wavelength range including a few hundred nm (for example no more than 400 nm).

The photosensitive unit can also be configured to perform wavelength-specific capturing of the incident radiation per image point. To this end, said unit may be configured as a color camera or include a color-resolving photosensitive sensor. In the case of wavelength-specific capturing, in the case of such color resolution, an individual measurement value generation per captured radiation (or wavelength-specific radiation component) is also possible when radiations having different wavelengths have common sites of incidence or regions of incidence on the photosensitive unit.

The capturing device can include a computational unit or can be connected to a computational unit to determine, from the measurement signals captured per radiation component, an associated first and second measurement value (for example by way of triangulation).

The capturing device can be configured to generate the measurement value as an intensity or based on a captured intensity (that is to say radiant flux density) of a back-reflected radiation component. In particular, this intensity can be integrated over an exposure time. According to an aspect of the disclosure, the measurement value is a distance value from the object surface (for example a value representing a distance between the object surface and the capturing device and/or the entire apparatus). Said distance value can be determined in a known manner using triangulation and on the basis of a site of incidence of the radiation in a capturing plane of the capturing device. This site of incidence can be determined, for example, as the site of a maximum captured intensity in the capturing plane and/or can be computationally determined, for example, from a captured spatial intensity distribution (for example using a Gaussian fit, as explained below). The capturing plane can be defined by an imaging unit (for example a CCD or CMOS sensor). Alternatively, the measurement value can be the site of incidence per se, that is to say indicate for example the coordinates of the site of incidence in the capturing plane. As a further alternative, the measurement value can be the captured and in particular temporally integrated intensity and/or spatial intensity distribution that is determined per measurement point from the back-reflected radiation component, or, in other words, can generally be a radiation measurement value.

At least the capturing device and the radiation generation device can be provided in a common module, in particular in a manually or automatically operable module or a handheld device, such as a manually operable laser line scanner. In other words, the capturing device and the radiation generation device can be combined in one design. For mechanic operation (that is to say a machine-bound use for example at a movement apparatus or a manipulator), the modules can be arranged for example on a measuring machine, a robot, or a machine tool.

The apparatus can also include an information determining device that is configured to determine object information on the basis of the measurement values, wherein per measurement point, at least one of the associated (i.e., belonging to said measurement point) first and second measurement values is taken into account. The information determining device can likewise be integrated in a module explained above. Alternatively, it can be provided separately therefrom (for example as a separate computer) and be connected for signal transmission to at least the capturing device so as to receive the ascertained measurement values therefrom. The object information can form a result data set. The (measurement) information that is to be considered for the, or for each, measurement point for example for a further evaluation or presentation can be collected in said result data set.

In one exemplary embodiment of the apparatus and method, the information determining device is configured to take into account either the first or the second measurement value per measurement point. In other words, the information determining device can be configured to choose between all the available measurement values for one (or for each) measurement point(s).

Additionally or alternatively, both measurement values can be taken into account for a (or for each) given measurement point(s) (that is to say not just one) and for example be subject to calculation (for example by forming an average). Mixed forms of the variants that have been described, in which the information determining device chooses between the measurement values for individual measurement points and considers both measurement values for other measurement points and, if needed, subjects them to calculation can also be provided according to an aspect of the disclosure. For example, the formation of an average can be specified as a standard procedure except when one of the measurement values meets an error criterion for a given measurement point. Next, a selection between the measurement values can be performed for said measurement point, and/or the other measurement value can be used therefor as standard.

Which one of the stated strategies is selected (for example either choosing between the determined measurement values, or calculating, or averaging) can be specified by a user before the object surface is measured. For example, if the user assumes that pronounced fluctuations in the intensity of the back-reflected radiation will occur in a given object surface during the measurement, choosing between the measurement values per measurement point can be advantageous. Specifying the evaluation strategy in this way can also form a separate step of the method that will be described below (for example in the form of specifying that, if an object surface exhibits reflection properties that meet a predetermined limit criterion (for example exceeds a permissible (local) change threshold value or a local gradient, a choice is made between the measurement values per measurement point. In this way, it is possible to avoid using measurement values that were formed based on back-reflected radiation having an impermissibly high intensity in a saturation region of the capturing device as a basis for the further evaluation. If, on the other hand, speckle appearances are assumed to be a main error potential, a calculation with respect to the measurement values may be preferred.

Furthermore, a (selective) calculation or choice is possible in particular if the measurement values are distance values. If, by contrast, the measurement values are intensity values or radiation measurement values or sites of incidence, making a choice may be used, in particular used exclusively (that is to say, no possibility for calculation may be provided).

The apparatus and the method can also include proposing and/or specifying a suitable strategy as regards making a choice or calculation with respect to the measurement values. This can be accomplished for example in dependence on properties of the object surface to be measured, wherein information relating to said properties can be determined for example from computer-aided design (CAD) data of the object. In addition or alternatively, it is possible, as part of a test measurement, to ascertain using the apparatus or another device the strategy that is advantageous for dealing with the plurality of measurement values per measurement point for a given object surface. For example, the risk of measuring in the saturation region of the capturing device and/or the possible extent of speckle appearances can be determined as part of such a test measurement.

In summary, it is thus possible that different operating modes are provided for dealing with the plurality of measurement values for the, or for each, measurement point, wherein it is possible to selectively switch (automatically or manually) between the operating modes. One of the operating modes can be selected individually per measurement point and/or for complete measurement processes of a given object surface or a surface region. The operating modes can relate to making a choice between the measurement values, as mentioned, or to the calculation with respect to said measurement values. According to an aspect of the disclosure, the apparatus and the method can also merely provide the performance of one of said operating modes (that is to say no selective switching between a plurality of operating modes).

The object information generated by the information determining device can be a collection of information provided for further processing, evaluation, and/or presentation. In particular, the object information can contain a collection of chosen measurement values or of measurement values that was determined for example by calculation from the originally captured measurement values. Furthermore, the object information can contain information that was determined based on measurement values in accordance with any of the aforementioned variants. If only one measurement point is measured, it is clear that the object information can also contain only information or a measurement value/measurement values for said one measurement point. The object information can be created and/or collected in the form of a data set. The object information can be utilizable for creating a graphic presentation and/or for imaging the object surface, for example for creating a three-dimensional presentation.

Figuratively speaking, the object information can thus relate to the data set that contains the information that was ultimately determined for the, or for each, measurement point and is intended, for example, for further evaluation. In other words, the object information can represent the result of a choice, a calculation or another way of dealing with the plurality of measurement values per measurement point to collect the information to be taken into account for the, or for each, measurement point hereafter. The object information therefore typically contains per measurement point merely one measurement value or merely one piece of information that was determined from the originally present plurality of measurement values per measurement point.

In a further configuration of the apparatus and of the method, the electromagnetic radiation having the first wavelength and the electromagnetic radiation having the second wavelength are at least temporarily simultaneously emitted and radiated onto the object surface. Additionally or alternatively, the projection or the emission of the radiation can be effected such that the measurement field is formed at least temporarily and typically at every time point by radiation having both the first and the second wavelength. In other words, radiation components having both wavelengths are at least temporarily and typically continuously radiated onto the object surface.

As a result, at least one defined time point can exist at which measurement values can be generated on the basis of both wavelengths. Furthermore, the necessary total measurement duration for measuring the object surface can be reduced hereby.

In this context, the reflected radiation having the first and the second wavelength can be captured during the simultaneous irradiation. In other words, the emission of the two wavelengths and the capturing thereof can take place at least with a partial temporal overlap, but in particular substantially simultaneously. In particular, the capturing device may perform capturing only if radiation having both wavelengths is captured and thus measurement values can be derived based on both wavelengths. This can also contribute to a reduction of the total measurement duration necessary for measuring the object surface.

In an exemplary embodiment of the apparatus and of the method, the radiation having the first wavelength and the radiation having the second wavelength are radiated onto the object surface with mutually differing intensities. In other words, the radiation having the first wavelength can have a lower or higher intensity than the radiation having the second wavelength. The difference between the intensities can be at least 10%, at least 30%, or at least 50%. Which intensities (or which intensity difference) is selected can be determined in dependence on the surface to be measured, in particular taking into account the material, reflectance, and/or shape thereof.

By irradiating with different intensities, it can be achieved that a too low or too strong local reflection of the electromagnetic radiations can be compensated. For example, the radiation having a higher intensity can be advantageous to capture weakly reflecting surface regions. To generate the final object information, it is possible to select in a measurement point having correspondingly weak reflection the measurement value that was obtained by irradiation with a higher intensity. A lower intensity, by contrast, can be advantageous for surface regions that exhibit increased reflectivity. In this case, an intensity that is too high can result in what is known as overexposure and may not be correctly captured by the capturing device. To generate the final object information, it is possible to select in a measurement point having correspondingly strong reflection the measurement value that was obtained by irradiation with the lower intensity. However, it goes without saying that even in this case the measurement values can be subjected to calculation, in particular by forming an average. In this way, the influence of any refraction that is too strong or too weak can be at least partially reduced.

Alternatively or additionally, different intensities can be generated by using a radiation attenuator, wherein at least one of the electromagnetic radiation having the first wavelength and the electromagnetic radiation having the second wavelength is attenuated by the radiation attenuator before being captured by the capturing device. The radiation attenuator can be an optical filter that is at least partially opaque for the wavelength that is to be attenuated. The radiation attenuator can be positioned within the, or in the region of the, radiation generation device. Alternatively or additionally, the radiation attenuator can be positioned in, or in the region of, the capturing device and in particular between an entry region for incident radiation and a photosensitive unit of the capturing device. It is possible even in this way to ensure that radiation components having different intensities are available for generating the measurement values.

Another option for generating different intensities, which may be provided as an alternative to or in combination with all the above mentioned variants, is to provide a capturing device having a wavelength-specific sensitivity. For example, the capturing device and in particular a photosensitive unit thereof can have a greater sensitivity for radiation having the first wavelength than for radiation having the second wavelength, or vice versa. Even if these radiations were originally emitted and/or reflected by the object surface with the same intensity, in this case, measurement signals of different strengths, from which ultimately the measurement values can be obtained, are captured by the capturing device. In this way, a measurement value that was generated on the basis of radiation having a lower intensity (or at least a lower captured intensity) and a measurement value that was generated on the basis of radiation having a higher intensity (or at least a higher captured intensity) are always available. This consequently results in analogous advantages, as explained above.

According to a further exemplary embodiment of the apparatus and the method, the radiation having the first wavelength and the radiation having the second wavelength are radiated onto the object surface at an angle with respect to one another. For example, the radiation generation device can be configured to generate such an alignment by a suitable optical unit and/or to produce the angled arrangement of the individual laser sources or laser diodes with respect to one another. In particular, the radiations can extend or propagate in a spatial plane that is substantially identical. The angles between the radiations can be chosen here such that they also intersect within the spatial plane. In particular, the radiations can form in each case one (typically planar) fan beam or can be emitted as such. Said fan beams can in turn extend in a substantially identical spatial plane, but in that case they extend at an angle with respect to one another and intersect.

An intersection region of the radiations and/or the fan beams can form or contain a possible measurement field in which a measurement value per measurement point can be determined based on both the first and on the second wavelength. Viewed starting from the radiation generation device and in particular from any wavelength-individual beam sources thereof, the radiations and/or fan beams can initially extend at a distance from one another and in the direction of the object surface to be measured. As described, they can intersect on account of the selected angle to provide a measurement field on the object surface within the intersection region. Radiation components located outside the intersection region, by contrast, can be ignored in the measurement value generation.

According to a further aspect of the apparatus and the method, the radiation having the first wavelength and the radiation having the second wavelength are directed onto the object surface along, or parallel with respect to, a common radiation axis. The radiation axis can also be referred to as radiation longitudinal axis or propagation axis of the radiation. It can designate an axis and/or a direction along which the radiation propagates, starting from the radiation generation device, and extends in the direction of the object surface that is to be measured. By emitting the radiations along a common radiation axis, they can extend substantially in a common spatial plane and/or overlap one another. In particular, it is possible hereby for contiguous fan beams to be aligned substantially congruently with respect to one another. Furthermore, the first and second electromagnetic radiation (but also any desired plurality of electromagnetic radiations having in each case a specific or individual wavelength, for example additionally a third or fourth electromagnetic radiation) can be coupled into one another by way of optical components such that they extend along a common radiation axis and are imaged on the object surface congruently in at least one common point or as at least one common line.

For providing a common radiation axis, the radiations can be coupled into one another. This can be done, for example, by way of at least one partially transmissive mirror. In particular in the context of automatically or manually moved apparatuses, it is possible (in addition or alternatively) to couple the radiations into a common light guide.

According to a further aspect of the apparatus and the method, the radiation having the first wavelength and the radiation having the second wavelength are directed onto the object surface parallel with respect to one another or, in other words, in each case parallel to a common axis. The common axis can extend between the beam or laser sources for the individual radiations and/or parallel with respect to the respective radiation axes of the radiations. In this context, it is advantageous if the radiations expand starting from the radiation generation device, for example in the form of the described fan beams, such that an intersection region is obtained despite the initially parallel alignment. In particular, the fan beams can expand after a predetermined distance such that they intersect with the common axis and also with one another. The intersection region then in turn contains radiation components having both wavelengths, such that the measurement region can be defined within the intersection region.

According to a further aspect of the apparatus and the method, the radiation reflected by the object surface is dividable into the first and the second radiation component, for example using an optical separating element of the capturing device. The optical separating element can include a beam splitter for dividing the reflected radiation into its wavelength-dependent components. In particular, the separating element can include a prism (for example dispersion prism) or be designed as such. The optical separating element can also include an oblique glass plate or can be configured as such. Additionally or alternatively, a lens of the capturing device can serve as the optical separating element. In this case, lens within the elements lens can variably refract the incident radiation (for example in the sense of a chromatic aberration) and thus divide it into its wavelength constituents.

As discussed above, it is possible in the apparatus and in the method to take into account or use only one of the first or second measurement values for generating the object information for at least one measurement point, wherein the considered measurement value fulfills a predetermined criterion. The criterion can be a quality criterion of the measurement value that can define for example a predetermined minimum absolute value. Additionally or alternatively, it is possible for at least one measurement point to determine a total measurement value on the basis of the first and the second measurement value. The total measurement value can then be formed in the abovementioned fashion by subjecting the measurement values to calculation, for example by forming an average and/or adding up differently weighted measurement values. The selected measurement value and/or the total measurement value can then be included in the object information and/or form said object information or be combined in the form of the object information. In other words, the object information can be formed on the basis of the selected measurement value and/or of the total measurement value.

The disclosure furthermore relates to a method for capturing an object surface, including: radiating a first electromagnetic radiation having a first wavelength and a second electromagnetic radiation having a second wavelength at least onto a measurement point to be measured of an object surface or onto a region to be measured of an object surface that has a measurement point that is to be measured, wherein no radiation, or no radiation that is used for surface capturing and/or no radiation that is usable for measurement value generation (for example no radiation that is capturable, convertible, or generally evaluable for measurement value generation) in a wavelength range between the first and second wavelength range is radiated; capturing at least one first measurement value and at least one second measurement value per measurement point, wherein the first measurement value is based on radiation having the first wavelength that is reflected by the object surface and the second measurement value is based on the radiation having the second wavelength that is reflected by the object surface. In addition, a step of ascertaining object information (for example with respect to the three-dimensional properties of the object surface) based on at least one of the first and the second measurement value per measurement point can be provided.

The method may include any further step and any further feature in order to provide all of the interactions, operating states and functions mentioned above and below. In particular, any explanations and further configurations of the apparatus features mentioned above and below can also be applied to the correspondingly worded method features or be provided therein. Furthermore, the method may be implementable or implemented with an apparatus according to any of the aspects mentioned above and below.

BRIEF DESCRIPTION OF THE DRAWINGS

The disclosure will now be described with reference to the drawings wherein.

DESCRIPTION OF EXEMPLARY EMBODIMENTS

Figure 1:
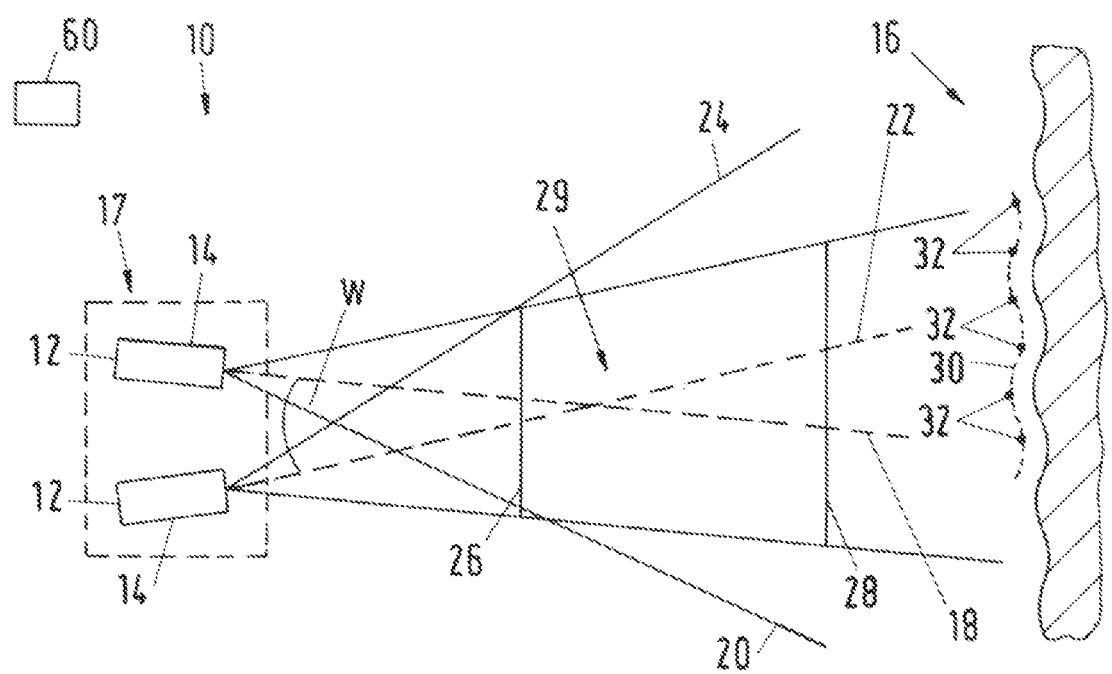
FIG. 1 shows a basic diagram of an apparatus, which carries out a method according to a first exemplary embodiment of the disclosure.

FIG. 1 shows an apparatus 10, which carries out a method according to a first exemplary embodiment to the disclosure. The apparatus 10 in the exemplary embodiment shown in FIG. 1 is configured as a laser line scanner, wherein the laser line scanner is a manually or automatically operable device or is configured as a manually or automatically operable integrated device.

The apparatus 10 includes a radiation generation device 17 including two separate beam sources 14 (or: radiation generators). The beam sources 14 are in each case configured to emit monochromatic electromagnetic radiation in the form of laser radiation and to direct it onto an object surface 16, which is shown schematically. Each of the beam sources 14 is here configured as an individual laser diode. Furthermore, each of the beam sources 14 can include optical elements to spread the radiation into one line or to form the fan beams which will be described below.

In detail, the radiation source 14, which is at the top in FIG. 1, emits monochromatic laser radiation having a first wavelength along a radiation axis 18. Starting from laser source 14, the radiation expands in the form of a triangular fan beam 20. Analogously, the radiation source 14, which is at the bottom in FIG. 1, emits monochromatic laser radiation having a second wavelength that differs from the first wavelength. The radiation here extends along a radiation axis 22 and again expands in the form of a fan beam 24. Both fan beams 20, 24 are here two-dimensional and extend within a common spatial plane.

In the exemplary embodiment shown in FIG. 1, the emitted radiation is red laser radiation and blue laser radiation having a single wavelength in the corresponding spectral ranges of visible light (for example 450 nm and 640 nm). However, the use of non-visible radiation is also possible. The wavelengths are thus spectrally spaced apart from one another (spaced apart from one another by a wavelength range between 450 nm and 700 nm, within which no radiation is used for irradiation). Consequently, there is a wavelength range between the emitted wavelengths within which no electromagnetic radiation that is used for surface capturing and that is relevant or usable for generating a measurement value (for example no electromagnetic radiation that is usable for evaluation) is generated and radiated onto the object.

Furthermore, it is apparent that the radiation axes 18 and 22 extend at an angle W with respect to one another. As a result, the fan beams 20 and 24 intersect. Consequently, laser radiation having the first and the second wavelengths is present in the intersection region.

A possible measurement region 29 of the apparatus 10 within which the object surface 16 can be measured with sufficient accuracy is located in FIG. 1 between the two (virtual) boundary lines 26 and 28. Said boundary lines 26 and 28 define a section of the intersection region of the two fan beams 20 and 24 within which radiation having the two emitted wavelengths is present. Since the object surface 16 in the illustration of FIG. 1 is located outside the measurement region 29 that is still limited by the boundary lines 26 and 28, is not yet possible in the condition shown in FIG. 1 to obtain meaningful object capturing.

It should furthermore be noted that the fan beams 20 and 24 in FIG. 1 are slightly inclined into the sheet plane. With respect to the sheet plane, the fan beams 20 and 24 extend downwardly at an angle. If they are incident on the object surface 16 within the region of the measurement region 29, the incident radiation defines a one-dimensional (that is to say line-shaped) measurement field 30, which may also be referred to as a laser line. In FIG. 1, one possible profile of the line-shaped measurement field 30 along the object surface 16 is indicated in dashes. Said measurement field follows the contour of the object surface 16. However, such an inclination of the fan beams 20 and 24 is not necessary because diffusely reflected radiation that can suffice for measurement value generation is obtained even at normal incidence on the object surface or in the case of radiation that is incident at another angle (that is to say diffusely reflected radiation is obtained in particular in the direction of the capturing unit).

The measurement field 30 contains a plurality of measurement points 32 in a row, which can also be referred to as scanning points. Again it should be noted that the measurement field 30, which is shown merely as an example, is formed on the object surface 16 and evaluable for precise determination of measurement values only when the object surface is moved closer in the direction to the radiation generation device 17, compared to the illustration in FIG. 1, and is typically positioned within the measurement region 29.

The radiation contained in the measurement field 30 is reflected by the object surface 16 in the direction of a capturing device 31, which will be described below with reference to FIG. 2A. In particular, both radiation (or a radiation component) having the first wavelength and radiation (or a radiation component) having the second wavelength are reflected in the direction of the capturing device 31. In the measurement points 32, a distance value between the capturing device 31 and the object surface 16 is then determined in each case according to a conventional triangulation principle. The position and/or distribution of the measurement point 32 is here determined for example by a resolution capability of the capturing device 31 and is illustrated merely as an example in FIG. 1.

Figure 2A:
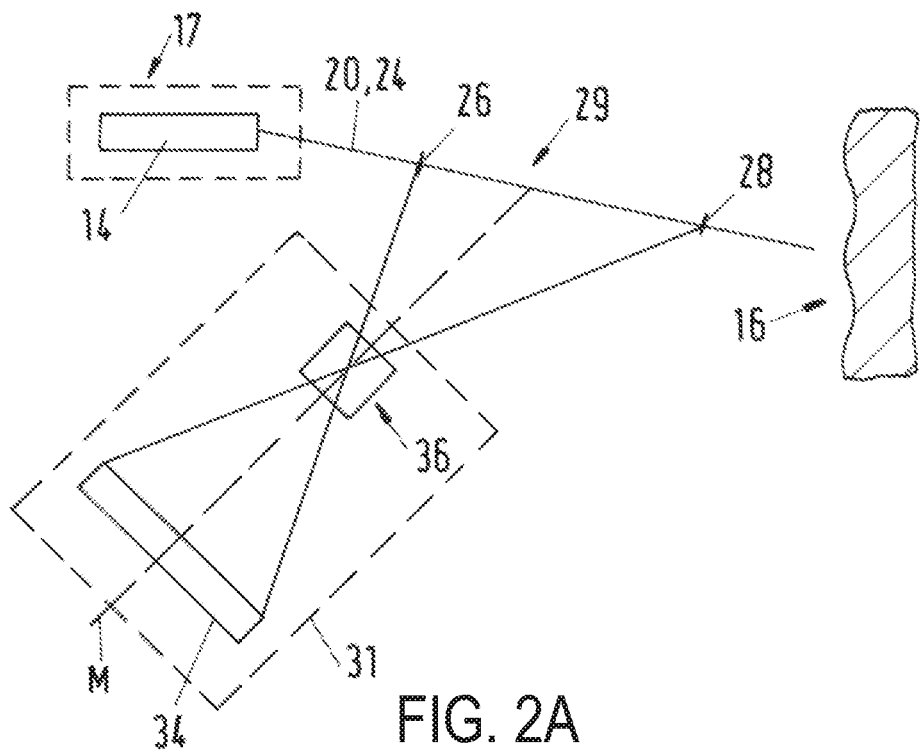
FIGS. 2A and 2B show detail illustrations for describing a capturing device of the apparatus shown in FIG. 1.

FIG. 2A shows a view of the apparatus 10 that is turned into the sheet plane by 90° with respect to FIG. 1. The two beam sources 14 of the radiation generation device 17 are therefore arranged one behind the other, wherein only the bottom beam source 14 shown in FIG. 1 is apparent in FIG. 2A. First, the beam profile of the fan beams 20 and 24, which is shown in FIG. 2A is line-shaped and extends in the direction of the object surface 16. The positions of the boundary lines 26 and 28 that delimit the measurement region 29 are furthermore marked.

Capturing device 31 shown in FIG. 2A includes a two-dimensional photosensitive unit 34. Examples of such a photosensitive unit 34 are a charge-coupled device (CCD) sensor or a complementary metal-oxide-semiconductor (CMOS) sensor. For description purposes, FIG. 2A also shows a possible beam profile starting from the positions of the boundary lines 26 and 28. The beam profiles in each case represent the profile of reflected radiation components containing both radiation having the first wavelength and radiation having the second wavelength when the object surface 16 is positioned at the corresponding boundary lines 26 and 28. In concrete terms, it can be seen that a possible reflected radiation component starting from the boundary line 26, which is on the left in FIG. 2A, is incident on a lower peripheral region of the photosensitive unit 34. Here, it images on the photosensitive unit 34 a line that extends into the sheet plane and thus in the column direction of the photosensitive unit 34 and has, in the line direction of the photosensitive unit 34 (that is to say in the sheet plane), per measurement point 32 a Gaussian-type intensity distribution (see also the following FIGS. 5A to 5C and 6A to 6C).

A reflective radiation component starting from the boundary line 28, which is on the right in FIG. 2A, on the other hand, is incident on an upper peripheral region of the photosensitive unit 34 and here images an analogous line, as in the case of the left-hand boundary line 26. Radiation components that are reflected by points located outside the boundary lines 26 and 28, or outside the measurement field 29, are consequently no longer capturable using the photosensitive unit 34 because they are no longer incident on the surface area defined thereby (that is to say would travel past the peripheral regions or outside thereof).

In a manner known per se, it is possible to calculate using a triangulation principle, from the measurement point-individual sites of incidence of the radiation on the photosensitive unit 34, a distance of the capturing unit 31 from the individual measurement points 32 on the object surface 16 and, in the case of spatially fixed positioning of the capturing unit 31 within the apparatus 10, also a distance of the apparatus 10 or any other units thereof from the object surface 16 (or the measurement points 32 located there). A corresponding distance value in the case shown forms the measurement value per measurement point 32 that is captured by the capturing device 31 (for example a computational unit thereof which is not illustrated separately) and/or calculated by triangulation. Since such triangulation is known per se, a more detailed description is not provided in the present case. However, one special feature of the case shown is that, per measurement point 32, a corresponding distance value based on radiation having the first wavelength and a distance value based on radiation having the second wavelength are captured (see the following description of FIG. 2B).

Information determining device 60, which is configured to determine object information of the object surface 16 based on the determined measurement values and/or to suitably collect all the available measurement values for a further evaluation, is shown merely schematically in FIG. 1. The information determining device 60 is likewise integrated in the apparatus 10 and is connected at least to the capturing device 31, which will be described below, for data transmission.

It should ultimately be noted that the radiation having the first wavelength and the radiation having the second wavelength are emitted at the same time by the radiation generation device 17 and directed onto the object surface 16. Furthermore, in temporal overlap therewith, the corresponding reflected radiation components 40 and 44 are captured by the capturing unit 31. Overall, it is thus possible to double the number of measurement values captured per measurement point 32 without significantly increasing the measurement time.

The reflected radiation that is incident on the photosensitive unit 34 consequently also always contains portions of both radiations that are emitted originally by the radiation generation device 17 and thus also of both associated wavelengths. In order to capture an individual (that is to say wavelength-specific) measurement value per wavelength, the capturing device 31 includes an optical separating element 36 in the form of a dispersion prism, which is shown merely schematically. The separating element 36 is positioned such that the reflected radiation passes through it before it is incident on the photosensitive unit 34.

Figure 2B:
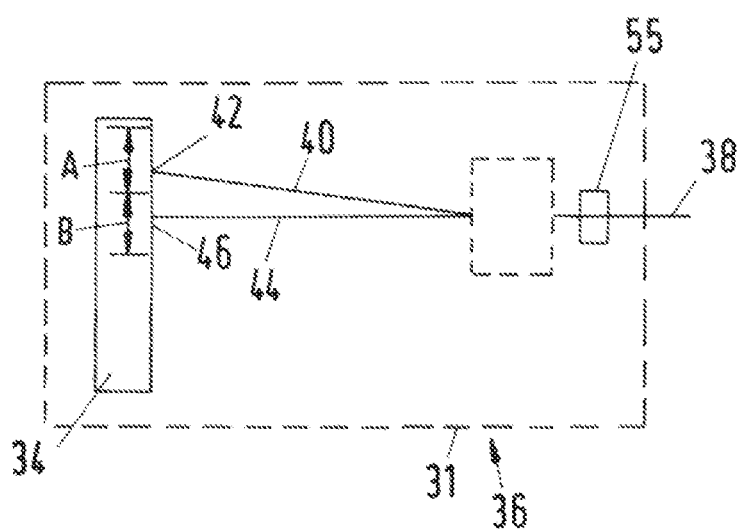

The effect of the separating element 36 becomes clear from the basic diagram shown in FIG. 2B. Once again, the capturing device 31 and a radiation 38 that is reflected starting from the object surface 16, which is not shown in this illustration, and enters the capturing device 31, are shown. Here, the reflected radiation 38 passes through the separating element 36 in the form of the dispersion prism and is then split into its wavelength-individual radiation components.

A first radiation (or a first radiation component) 40 that is incident on the photosensitive unit 34 in a site of incidence 42 that is located toward the top is shown in FIG. 2B. Furthermore, a second radiation (or a second radiation component) 44 that is incident on the photosensitive unit 34 in a site of incidence 46 that is offset from the site of incidence 42 that is located toward the top is shown in FIG. 2B. The first and second radiations 40 and 44 have different wavelengths, which are identical to the originally emitted wavelengths. As shown in FIG. 2B, one radiation 40 is radiation having the originally emitted first wavelength and the other radiation 44 is radiation having the originally emitted second wavelength. For illustration purposes, it is assumed in this context that the radiations 40 and 44 originate from reflections at individual measurement points 32. In fact, in the case of a projected line, line-shaped radiation components are also reflected and corresponding lines of incidence (and not just individual sites of incidence 42 and 46) are imaged on the photosensitive unit 34.

Since the sites of incidence 42 and 46 on the photosensitive unit 34 are located at different positions (are spatially spaced apart from one another), it is possible to determine, for each of the radiations 40 and 44 and thus for each of the first and second wavelengths, individual measurement values in the form of the previously described distance values per measurement point 32. Alternatively, the measurement values can relate to the intensity values described below and/or to intensity value maxima or to the sites of incidence that were determined based thereon.

In detail, the photosensitive unit 34 shown in FIG. 2B is divided into individual regions A and B. These regions are defined such that radiation 40 that is generated or reflected within the measurement region 29 of the apparatus 10 and includes only radiation having a first wavelength is always incident on the photosensitive unit 34 within the region A after passing through the separating element 36. Reflected radiation 44 having the second wavelength, by contrast, is always incident on the photosensitive unit 34 in the second region B, as long as it is reflected by the object surface 16 from a position within the measurement region 29 of the apparatus 10.

In other words, the reflected radiation components 40 and 44 having different wavelengths (and also any lines that are imaged in each case hereby on the photosensitive unit 34) are directed onto different regions A and B of the photosensitive unit 34 and are thus spatially separated. Alternatively, individual photosensitive units 34 can be provided per radiation 40 and 44 and the associated wavelength, wherein the individual photosensitive units 34 can be positioned for example in accordance with the regions A and B shown in FIG. 2B.

Finally, it should be noted that corresponding regions A and B can also be positioned on both sides of a central axis M, as shown in FIG. 2A, so as to be able to capture all possible deflections or refractions of the radiation components 40 and 44 by the separating element 36. Additionally or alternatively, the regions A and B can also at least partially overlap, wherein radiation that is incident in the overlap region can be divided into the individual wavelengths or can be assigned thereto, for example by using capturing pixels (for example RGB pixels) having different wavelength sensitivities. As explained above, the radiations can, however, in principle be imaged onto spatially separate regions of one and the same capturing device 31 or photosensitive unit 34 owing to the effect of the prism 36. The capturing device 31 does not necessarily have to be color sensitive but can be configured for example as a monochromatic camera and/or capture only a limited wavelength range of, for example, 400 nm to 800 nm. In this case, it is also possible to generate from the plurality of the captured radiation components or measurement curves a plurality of measurement values per (object) measurement point. If an exact assignment of said measurement values to the emitted wavelengths is desired (which is not absolutely necessary), it is possible for example to use calibration information and/or information relating to object geometry.

As a result, the apparatus 10 of the exemplary embodiment shown in FIG. 1 can thus contactlessly scan and capture the object surface 16. In the process, it determines for a plurality of measurement points 32 distance values that can be used in a known manner for defining a 3D point cloud of the object surface 16 and/or for generating information relating to or presentations of a three-dimensional shape of the object surface 16. As mentioned, the apparatus 10 to this end emits radiation having a first wavelength and radiation having a second wavelength. For each of these radiations or wavelengths, a separate and thus individual measurement value per measurement point 32 is then determined. This is done by dividing the back-reflected radiation 38 into radiation components 40 and 44 having the first and second wavelength, respectively, as is explained with reference to FIG. 2B.

In order to ultimately generate object information for further measurement evaluation and/or as a result data set, it is possible to take into account for each of the measurement points 32 in the measurement field 30 either the measurement value that was generated based on the radiation 40 having the first wavelength or the measurement value that was generated based on the radiation 44 having the second wavelength. It is likewise possible to take both of these measurement values into consideration and to subject them to calculation for example by forming an average. The selection of the ultimate strategy with respect to dealing with a plurality of measurement values per measurement point 32 can here be made in accordance with any of the variants generally explained above. Merely by way of example, forming an average for the plurality of measurement values per measurement point 32 can be typical if it is assumed that there is a high potential for measurement falsifications on account of the speckle appearances described above. According to an aspect of the disclosure, in this case the likelihood is increased that at least one of the emitted radiations exhibits no speckle appearances, or only slight speckle appearances, at a measurement point 32 under consideration and that thus usable (total) measurement values (or object information) for said measurement point can be determined. This is true in particular when compared to the case where only a single radiation is present by way of which, in the case of speckle appearances, measurement values that are not usable for each measuring point 32 can be determined under certain circumstances.

In the exemplary embodiment, the apparatus 10 is furthermore configured to select an intensity (or beam flux density) of the emitted radiation having the first wavelength and the emitted radiation having the second wavelength differently from one another. However, the apparatus 10 can likewise substantially match the intensities of the radiations to one another. In particular, the apparatus 10 can be selectively operable in an operating mode in which different intensities are provided or in an operating mode in which similar or identical intensities are provided. The selection of a suitable operating mode can be made for example by an operator of the apparatus 10.

The procedure of the measurement of the object surface 16 is then implemented analogously to the previously described variant even in the case of different intensities. More specifically, wavelength-individual or wavelength-specific measurement values are again generated per measurement point 32 of the measurement field 30, but wherein one is based on the radiation having a higher intensity and the other is based on the radiation having a lower intensity. If the object surface 16 has greatly varying reflectance, this may possibly be compensated by the selection of the different intensities. If a measurement point 32 for example is located in a region having a high reflectance, radiation having a high intensity can result in radiation 40 and 44 that is located in a saturation region of the photosensitive unit 34 and consequently no longer allows exact measurement value capturing. In this case, the radiation 40 and 44 having the lower intensity would have to be used for generating the final object information. At a low reflectance, on the other hand, radiation 40 and 44 having a lower radiation intensity can make capturing of a suitable measurement value more difficult, which means that the radiation 40 and 44 having the higher intensity would have to be used for generating the final object information.

In summary, in the variant with different radiation intensities, a selection can thus be made between the measurement values that are generated per measurement point 32, for example by the information determining device 60.

To provide the different intensities, the beam sources 14 can be appropriately controlled such that they emit radiation having different intensities. Alternatively or additionally, a radiation attenuator 55 can be provided that attenuates at least one of the radiations emitted by the beam sources 14 before it is captured by the photosensitive unit 34. One possible position of a radiation attenuator 55 in the form of an optical filter is indicated schematically in FIG. 2B. The filter is here arranged within the capturing device 31, specifically such that incident radiation passes through the filter before it is incident on the photosensitive unit 34. Such an optical filter can also be positioned between one of the beam sources 14 and the object surface 16, but typically outside the intersection region of the fan beams 20 and 24.

Alternative exemplary embodiments will be explained below with reference to FIGS. 3 and 4. The differences as compared to the previous exemplary embodiment are limited here to the radiation generation device 17. The capturing device 31 and the general measurement procedure, on the other hand, are analogous to the previous example and will for that reason not be explained again.

Figure 3:
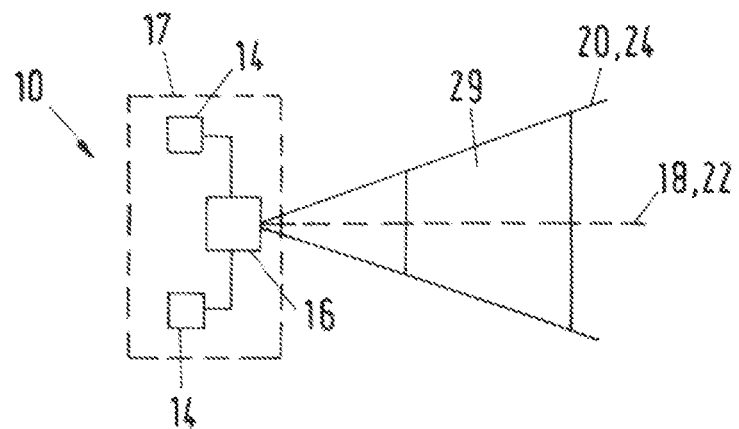
FIG. 3 shows a basic diagram of an apparatus, which carries out a method according to a second exemplary embodiment of the disclosure.

FIG. 3 shows a radiation generation device 17 in accordance with a second exemplary embodiment. Radiation generation device 17 includes two beam sources 14. One of the beam sources 14 emits monochromatic electromagnetic radiation having a first wavelength (for example a red laser beam), while the other beam source 14 emits monochromatic radiation having a second wavelength (for example a blue laser beam). The beam sources 14 are connected in light-guiding fashion to a beam coupler 16. The respectively emitted radiations are coupled into one another by the beam coupler 16 and emitted in the direction of an object surface 16, which is not illustrated. This is done in a manner such that both radiations extend along a common radiation axis 18 and 22 and expanding the form of congruent fan beams 20 and 24. Consequently, a radiation having the first wavelength and a radiation having the second wavelength are present at each spatial position of the emitted radiation. If an object surface 16 is positioned within the congruent fan beams 20 and 24 and typically in a measurement region 29 of the apparatus 10 (not shown in either case), it is possible in the manner explained above to capture wavelength-individual or wavelength-specific measurement values per measurement point 32.

Figure 4:
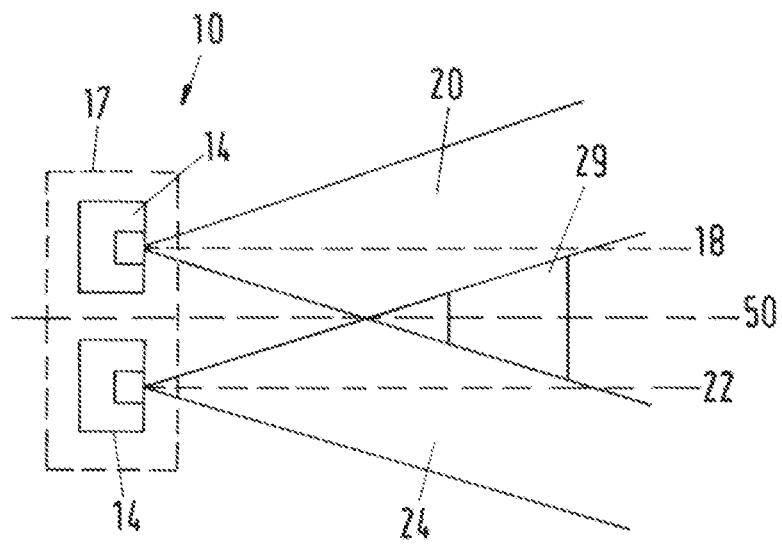
FIG. 4 shows a basic diagram of an apparatus, which carries out a method according to a third exemplary embodiment of the disclosure.

FIG. 4 shows a further exemplary embodiment of the apparatus 10, in which the radiation generation device 17 again includes two beam sources 14. The beam sources 14 are here positioned one next to the other and emit electromagnetic radiation into the environment (and not into a light guide or beam coupler 16, as shown in FIG. 3). More specifically, one of the beam sources 14 emits monochromatic radiation having a first wavelength (for example a red laser beam), while the second beam source 14 emits monochromatic radiation having a second wavelength (for example a blue laser beam). The radiations here again expand in the form of two-dimensional fan beams 20 and 24. In the case shown, said fan beams 20 and 24, or the associated radiation axes 18 and 22, extend parallel with respect to one another and also parallel with respect to a common axis 50 of the radiation generation device 17. The beam sources 14, however, are positioned such that the fan beams 20 and 24 thereof intersect in the region of the common axis 50. Once again, radiation having the first and having the second wavelength is present in the intersection region. If an object surface 16 is positioned in said intersection region and typically in a measurement region 29 of the apparatus 10 that is defined there (not shown in either case), wavelength-individual measurement values can again be determined for each measurement point 32.

It should furthermore be noted that the use, mentioned above with reference to FIGS. 2A and 2B, of an optical separating element 36 is not required. Instead, a color-sensitive photosensitive unit 34 can be used (for example in the form of a color camera in a capturing device 31). Said photosensitive unit can determine in a known manner the intensity of the individual colors (or the individual wavelengths) within the incident radiation 38 at each site of incidence 42 and 46 and in particular determine an intensity distribution over a spectrum having a plurality of wavelengths (for example over the visible spectrum). This relates in particular to the case that a respective site of incidence 42 and 46 on the photosensitive unit 34 is defined by a pixel containing a plurality of detector units, wherein each detector unit is sensitive to a plurality of individual wavelengths or colors (for example what is known as an RGB pixel or detector pixel). It is consequently possible to separately determine for each site of incidence 42 and 46 on the photosensitive unit 34 the incidence intensity for each of the different wavelengths, from which a wavelength-individual measurement value per measurement point 32 is again determinable.

Figure 5A:
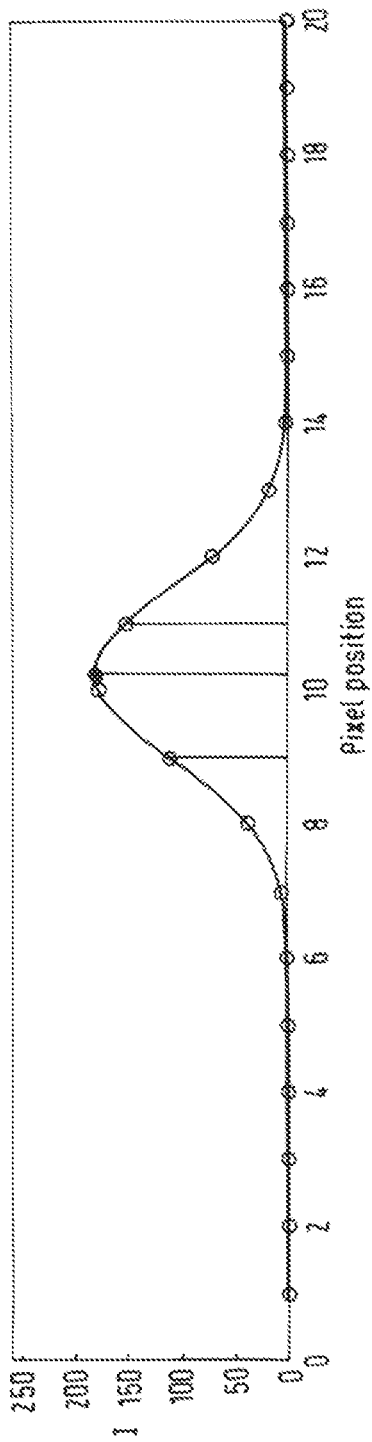
FIGS. 5A to 5C show illustrations of capturable signals in the related art.
Figure 5B:
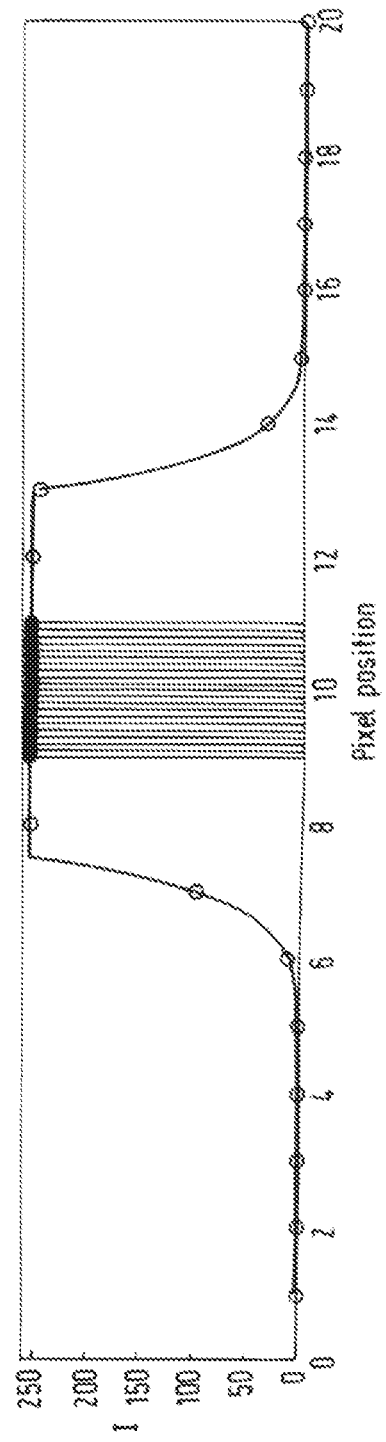
Figure 5C:
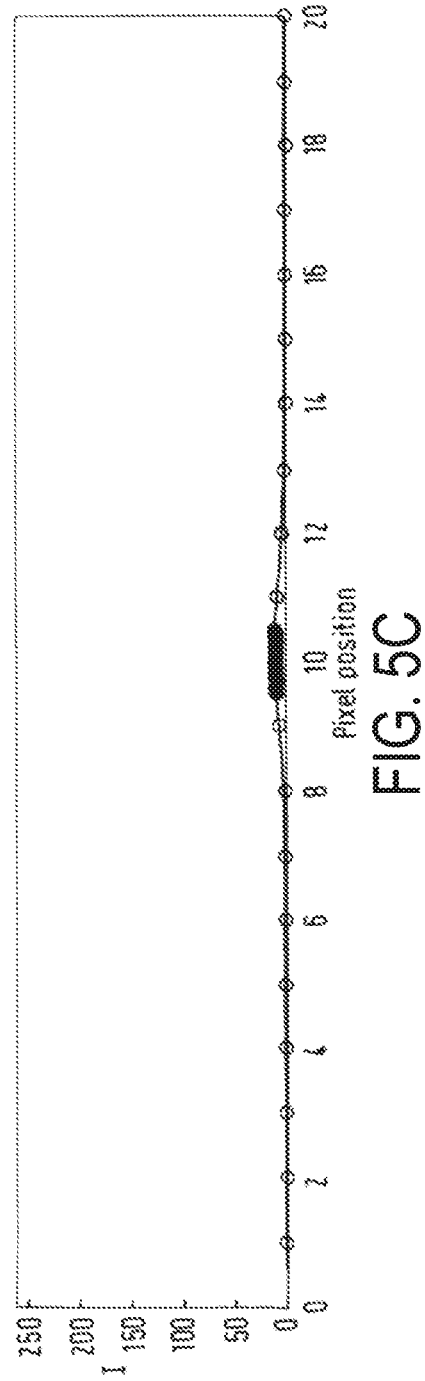

FIGS. 5A to 5C show diagrams for describing signals that are capturable using conventional solutions according to the related art. What is shown here in each case is a row-related intensity distribution that is made up of intensity values captured at individual pixel positions in a row of the capturing device 31 (and in particular a photosensitive unit 34 or sensor surface thereof). The intensity values per pixel position are here marked by empty circles. In a manner known per se, a row (or the row signal) of the capturing device 31 is assigned to an individual measurement point 32 on the object surface 16, whereas in the column direction of the capturing device 31, the signals (or intensity distributions) received per measurement point 32 are arranged one next to the other. As a consequence, the laser line that is projected onto the object surface 16 and reflected back thereby is imaged in the column direction.

Consequently, in FIG. 5A, the light that is reflected back by the object surface 16 is captured by the capturing device 31, specifically such that for an individual measurement point 32, a row-related intensity distribution is obtained in which an individual intensity value per pixel or per pixel position is present in the row direction. The intensity value can be given in the form of a grayscale value. Here, the incident intensity is integrated to form an intensity value over an exposure time that is assumed to be constant in the case shown.

Subsequently, a Gaussian distribution of the intensity is calculated based on the correspondingly determined discrete spatial distribution of the intensity values (see empty circles in FIG. 5A), for example using a conventional Gaussian fit or, in other words, using conventional Gaussian curve fitting. The actual maximum value of the intensity is thus determined by calculation and is illustrated in FIG. 5A by a filled circle. Said maximum value is also assigned a site of incidence (or pixel position), determined by calculation, of the maximum intensity in the row under consideration of the capturing device. Said site of incidence in the case shown lies at approximately 10.3 and is also used in a known manner for the further triangulation (i.e. assigned to a measurement point 32 under consideration as an actual site of incidence). The procedure described can also be referred to as a light section method.

FIG. 5A shows the case of a conventional radiation reflection by an object surface 16. By contrast, in FIG. 5B, radiation falls onto an object surface 16 that is unusually highly reflective. It can be seen that between the pixel positions 8 and 13, in each case intensity values are obtained that are in a saturation region of the capturing device. Consequently, in each case one maximum intensity value is output at said pixel positions, although the points on the surface by which the radiation components that are captured at the pixel positions 8 to 13 are reflected can be spaced apart from the capturing device 31 to differing extents. However, these different distances can no longer be captured in a sensing manner and reconstructed on account of the saturation region being reached.

Upon attempting to perform a Gaussian fit based on the intensity distribution from FIG. 5B, a plateau-type intensity distribution would therefore be obtained (if it were to succeed) in the region of the pixel positions 9 to 11, because the maximum capturable intensity is located here in each case. Accordingly, it would not be possible to determine an individual intensity maximum value, but only a value range of the maximum intensity (see filled circles in FIG. 5B). It is thus not possible (or at least not possible with sufficient accuracy) to determine an individual site of incidence with the maximum intensity, to assign it to a measurement point 32 under consideration, and to use it for triangulation. Rather, a desired site between the pixels 9 to 11 would have to be selected, which accordingly reduces the accuracy that is attainable.

FIG. 5C furthermore shows the case of a weakly reflecting surface. It can be seen in this case that the intensity values are so low that again only a maximum value distribution is determinable in the region of the pixel positions 9 to 11 (see filled circles). It would be necessary again to select any desired site between the pixels 9 to 11 rather than being able to ascertain precisely the actual site at which the maximum intensity occurs.

Figure 6A:
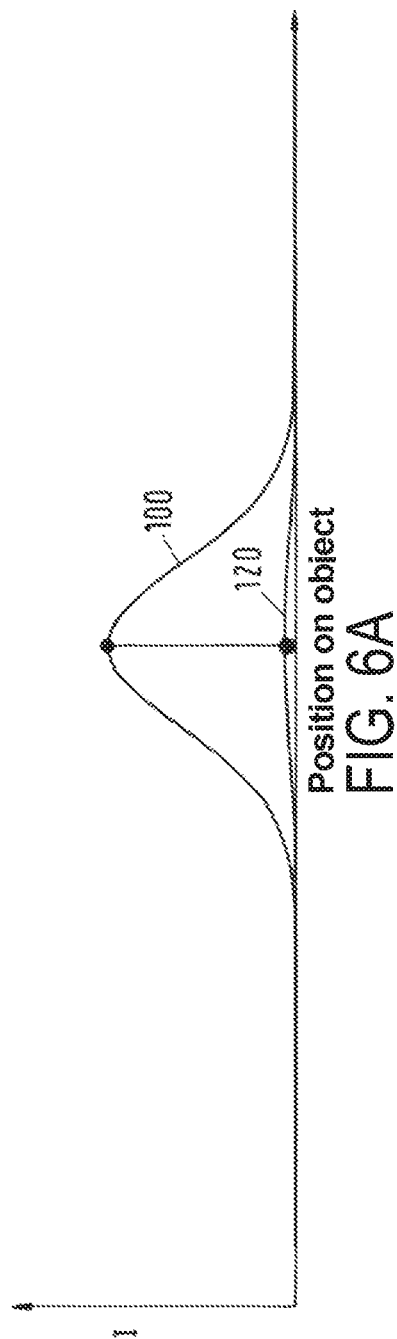
FIGS. 6A to 6C show illustrations of capturable signals in solutions according to the exemplary embodiments of the disclosure.
Figure 6B:
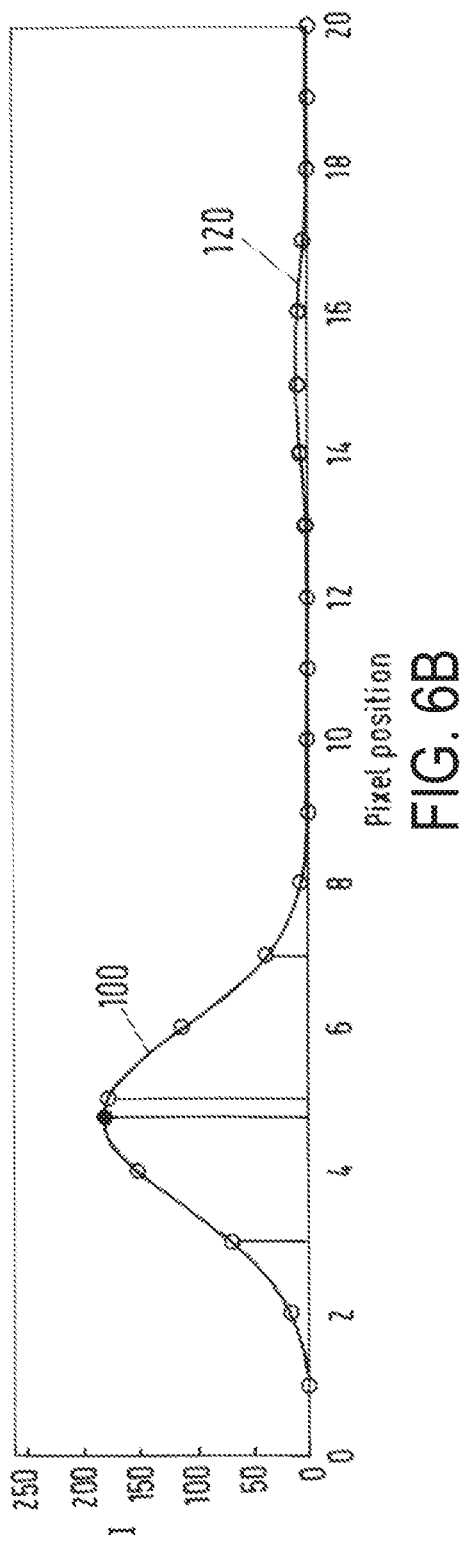
Figure 6C:
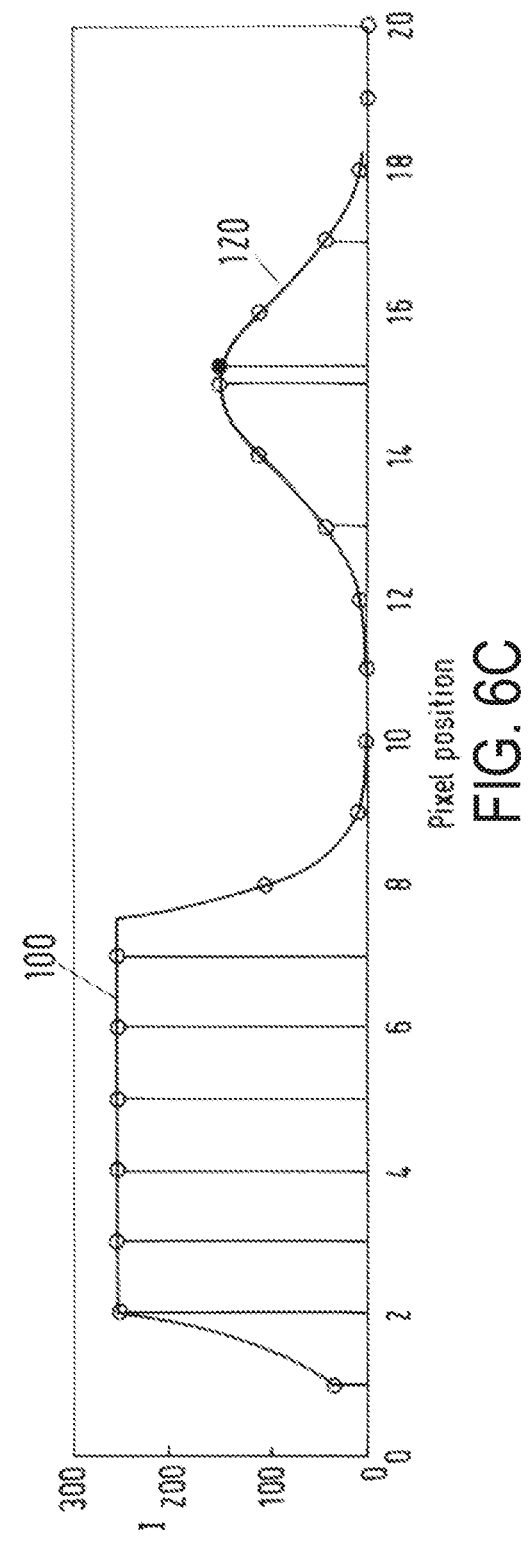

FIGS. 6A to 6C show illustrations for describing the signals that are capturable according to the exemplary embodiments of the disclosure. FIG. 6A here shows initially an intensity distribution of the emitted radiation on the object surface 16 or along individual object positions. Such an intensity distribution can be obtained transversely to the laser line direction and can be present in the region of an individual measurement point 32 that is to be captured. It can be seen that radiation having a first wavelength 100 and radiation having a second wavelength 120 are emitted.

Viewed along the object surface, the incident radiation intensity has again a Gaussian distribution, wherein the radiation having the first wavelength 100 generally has a higher intensity than the radiation having the second wavelength 120.

FIGS. 6B to 6C show, analogously to FIGS. 5A to 5C, row-related intensity distributions (i.e. intensity distributions determined for an individual measurement point 32) that are capturable based on the back-reflected radiation by the capturing device 31. Since the back-reflected radiation is separated into individual radiation components 40 and 44 by way of the above-described prism or the separating element 36, two spatially separated Gaussian-type intensity distributions are obtained on the photosensitive unit or the sensor surface of the capturing device 31. These intensity distributions are arranged according to the regions of incidence A and B shown in FIG. 2B.

FIG. 6B shows an intensity distribution captured by sensing in the case of a weakly reflecting object surface 16. It can be seen that high intensity values for the first wavelength 100 are measured in the region of the pixel positions 4 to 5. Based on the irradiation with the second wavelength 120, which was emitted with the significantly lower intensity anyway (see FIG. 6A), by contrast, hardly evaluable and only very low intensities are determined in the region of the pixel positions 14 to 16. The evaluation by calculation is therefore limited to the intensity distribution on the left in FIG. 6B, which was generated based on the radiation having the first wavelength 100. Again it is possible to calculate, based thereon, an intensity maximum value, which is illustrated by a filled circle (approximately at the pixel position 4.8). It can be used for further triangulation as a site of incidence, ascertained by calculation, for the measurement point 32 under consideration.

FIG. 6C shows the case of a strongly reflecting object surface 16. In this case, the radiation having the first wavelength 100 results in the same saturation phenomenon, as described with reference to FIG. 5B, on account of the higher intensity thereof in the associated region of incidence thereof between the pixel positions 1 to 9. Based on the back-reflected radiation having the second wavelength 120, by contrast, a precise evaluable Gaussian intensity distribution is obtained in the associated region of incidence between the pixel positions 11 to 19, for which the site of incidence of the maximum intensity can be determined by calculation in the manner explained above (approximately at 15.2).

It is to be understood that the above row-related considerations can be carried out for each row and thus on each measurement point 32, wherein the measurement points 32 or the row-related intensity distributions determined herefor are arranged one next to the other in the column direction of the capturing device 31.

This illustrates that the solution presented makes reliable measurement of object surfaces with a variety of properties possible.

It is understood that the foregoing description is that of the exemplary embodiments of the disclosure and that various changes and modifications may be made thereto without departing from the spirit and scope of the disclosure as defined in the appended claims.

What is claimed is:

1. An apparatus for capturing an object surface, the apparatus comprising:
a radiation generation device having at least one beam source, and being configured to:
radiate a first electromagnetic radiation having a first wavelength and a second electromagnetic radiation having a second wavelength onto at least one measurement point of the object surface to be measured or onto a region of the object surface to be measured, the region including the at least one measurement point, wherein the first electromagnetic radiation and the second electromagnetic radiation are radiated (1) without emitting radiation in a wavelength range between the first wavelength and the second wavelength onto the at least one measurement point of the object surface or onto the region of the object surface, or (2) without emitting the radiation utilized for surface capturing in the wavelength range between the first wavelength and the second wavelength onto the at least one measurement point of the object surface or onto the region of the object surface;
a capturing device configured to capture for the at least one measurement point at least one first measurement value and at least one second measurement value, the at least one first measurement value being based on the radiation having the first wavelength and being reflected by the object surface and the at least one second measurement value being based on the radiation having the second wavelength and being reflected by the object surface; and
each of the at least one first measurement value and the at least one second measurement value being a distance value representing a distance between the capturing device and the object surface,
wherein the capturing device includes an optical separating element configured to divide the reflected radiation reflected by the object surface into a first radiation component and a second radiation component,
wherein the first radiation component and the second radiation portion impinge on different sites of incidence on a photosensitive unit of the capturing device or on different photosensitive units of the capturing device after being divided by the optical separating element, and
wherein the first and second radiation components have different wavelengths which are identical to the originally emitted first and second wavelengths, respectively.

2. The apparatus as claimed in claim 1, wherein the radiation generation device is configured to radiate the first electromagnetic radiation having the first wavelength and the second electromagnetic radiation having the second wavelength at least temporarily simultaneously onto the object surface.

3. The apparatus as claimed in claim 1, wherein the apparatus is configured to radiate the first electromagnetic radiation having the first wavelength and the second electromagnetic radiation having the second wavelength onto the object surface with intensities that deviate from one another.

4. The apparatus as claimed in claim 1, further comprising:
a radiation attenuator configured to for attenuate at least one of the first electromagnetic radiation having the first wavelength and the second electromagnetic radiation having the second wavelength before the first and second electromagnetic radiations are captured by the capturing device, and/or
wherein the capturing device has a first sensitivity for the first electromagnetic radiation having the first wavelength and a second sensitivity for the second electromagnetic radiation having the second wavelength, and the first sensitivity is different from the second sensitivity.

5. The apparatus as claimed in claim 1, wherein the radiation generation device is configured to radiate the first electromagnetic radiation having the first wavelength and the second electromagnetic radiation having the second wavelength onto the object surface at an angle with respect to one another.

6. The apparatus as claimed in claim 1, wherein the radiation generation device is configured to radiate the first electromagnetic radiation having the first wavelength and the second electromagnetic radiation having the second wavelength onto the object surface substantially along or parallel with respect to a common radiation axis.

7. The apparatus as claimed in claim 1, further comprising:
an information determining device configured to determine object information based on the at least one first measurement value and the at least one second measurement value, wherein for the at least one measurement point, or for each of the at least one measurement point, at least one of the at least one first measurement value and the at least one second measurement value is taken into account.

8. The apparatus as claimed in claim 7, wherein the information determining device is configured to take into account only one of the at least one first measurement value or the at least one second measurement value for the at least one measurement point and/or to determine a total measurement value based on the at least one first measurement value and the at least one second measurement value for the at least one measurement point.

9. The apparatus as claimed in claim 1, wherein the radiation generation device includes a first beam source configured to generate the first electromagnetic radiation and a second beam source configured to generate the second electromagnetic radiation, and
wherein each of the first and second beam sources is configured as a laser source.

10. The apparatus as claimed in claim 1, wherein the wavelength range in which the radiation is not radiated and which lies between the first and second wavelengths is at least 50 nm.

11. The apparatus as claimed in claim 1, wherein the wavelength range in which the radiation is not radiated and which lies between the first and second wavelengths is at least 100 nm.

12. The apparatus as claimed in claim 1, wherein the wavelength range in which the radiation is not radiated and which lies between the first and second wavelengths is at least 200 nm.

13. The apparatus as claimed in claim 1, further comprising:
a radiation attenuator configured to for attenuate at least one of the first electromagnetic radiation having the first wavelength and the second electromagnetic radiation having the second wavelength before the first and second electromagnetic radiations are captured by the capturing device, and
wherein the radiation attenuator is an optical filter.

14. The apparatus as claimed in claim 1, wherein the optical separating element is a lens of the capturing device.

15. The apparatus as claimed in claim 1, further comprising:
an information determining device configured to determine object information based on the at least one first measurement value and the at least one second measurement value, wherein for the at least one measurement point, or for each of the at least one measurement point, the at least one first measurement value and the at least one second measurement value is taken into account, and
wherein the object information is information relating to three-dimensional characteristics of the object surface.

16. The apparatus as claimed in claim 1, further comprising:
an information determining device configured to determine object information based on the at least one first measurement value and the at least one second measurement value, wherein for the at least one measurement point, or for each of the at least one measurement point, the at least one first measurement value and the at least one second measurement value is taken into account,
wherein the object information is information relating to three-dimensional characteristics of the object surface, and
wherein the information determining device is configured to determine a total measurement value based on the at least one first measurement value and the at least one second measurement value for the at least one measurement point.

17. A method for capturing an object surface, the method comprising:
radiating a first electromagnetic radiation having a first wavelength and a second electromagnetic radiation having a second wavelength onto at least one measurement point of the object surface to be measured or onto a region of the object surface to be measured, the region including the at least one measurement point, wherein the first electromagnetic radiation and the second electromagnetic radiation are radiated (1) without emitting radiation in a wavelength range between the first wavelength and the second wavelength onto the at least one measurement point or onto the region of the object surface, or (2) without emitting the radiation utilized for surface capturing in the wavelength range between the first wavelength and the second wavelength onto the at least one measurement point of the object surface or onto the region of the object surface;
capturing, by a capturing device, at least one first measurement value and at least one second measurement value for the at least one measurement point, the at least one first measurement value being based on the radiation having the first wavelength and being reflected by the object surface and the at least one second measurement value being based on the radiation having the second wavelength and being reflected by the object surface; and
each of the at least one first measurement value and the at least one second measurement value being a distance value representing a distance between the capturing device and the object surface,
wherein the capturing device includes an optical separating element configured to divide the reflected radiation reflected by the object surface into a first radiation component and a second radiation component,
wherein the first radiation component and the second radiation portion impinge in different sites of incidence on a photosensitive unit of the capturing device or on different photosensitive units of the capturing device after being divided by the optical separating element, and wherein the first and second radiation components have different wavelengths which are identical to the originally emitted first and second wavelengths, respectively.

18. An apparatus for capturing an object surface, the apparatus comprising:
a radiation generation device having at least one beam source, and being configured to:
radiate a first electromagnetic radiation having a first wavelength and a second electromagnetic radiation having a second wavelength onto at least one measurement point of the object surface to be measured or onto a region of the object surface to be measured, the region including the at least one measurement point, wherein the first electromagnetic radiation and the second electromagnetic radiation are radiated (1) without emitting radiation in a wavelength range between the first wavelength and the second wavelength onto the at least one measurement point of the object surface or onto the region of the object surface, or (2) without emitting the radiation utilized for surface capturing in the wavelength range between the first wavelength and the second wavelength onto the at least one measurement point of the object surface or onto the region of the object surface;
a capturing device configured to capture for the at least one measurement point at least one first measurement value and at least one second measurement value, the at least one first measurement value being based on the radiation having the first wavelength and being reflected by the object surface and the at least one second measurement value being based on the radiation having the second wavelength and being reflected by the object surface, and
wherein each of the at least one first measurement value and the at least one second measurement value is a distance value representing a distance between the capturing device and the object surface,
wherein the radiation generation device is configured to radiate the first electromagnetic radiation having the first wavelength and the second electromagnetic radiation having the second wavelength at least temporarily simultaneously onto the object surface,
wherein the capturing device is configured to capture a reflected radiation having the first and second wavelengths during a simultaneous radiation,
wherein the capturing device includes an optical separating element configured to divide the reflected radiation reflected by the object surface into a first radiation component and a second radiation component,
wherein the first radiation component and the second radiation portion impinge in different sites of incidence on a photosensitive unit of the capturing device or on different photosensitive units of the capturing device after being divided by the optical separating element, and
wherein the first and second radiation components have different wavelengths which are identical to the originally emitted first and second wavelengths, respectively.

* * * * *